(12) United States Patent
Howes (10) Patent No.: US 8,149,509 B2
(45) Date of Patent: Apr. 3, 2012

(54) PROJECTION SCREEN AND METHOD OF CONSTRUCTIONS

(75) Inventor: Alex Howes, London (GB)

(73) Assignee: Musion IP Limited (GB)

( * ) Notice: Subject to any disclaimer, the term of this patent is extended or adjusted under 35 U.S.C. 154(b) by 304 days.

(21) Appl. No.: 12/437,931

(22) Filed: May 8, 2009

(65) Prior Publication Data

US 2009/0316260 A1    Dec. 24, 2009

Related U.S. Application Data (60) Provisional application No. 61/051,397, filed on May 8, 2008.

(51) Int. Cl.
  *G03B 21/00* (2006.01)
  *G03B 21/56* (2006.01)
  *G02B 27/22* (2006.01)
(52) U.S. Cl. ............ 359/478; 353/10; 353/74; 359/443; 359/449
(58) Field of Classification Search .................. 156/60, 156/91; 359/156, 443
  See application file for complete search history.

(56) References Cited

U.S. PATENT DOCUMENTS

| | | | |
|---|---|---|---|
| 111,694 A * | 2/1871 | Shear ............................ | 114/112 |
| 3,243,858 A * | 4/1966 | Melanson ........................ | 24/693 |
| 3,577,583 A * | 5/1971 | Amann ........................... | 16/87.2 |
| 3,776,382 A * | 12/1973 | Wright et al. ................... | 209/403 |
| 4,816,153 A * | 3/1989 | Ando et al. ..................... | 210/445 |
| 4,927,238 A * | 5/1990 | Green et al. .................... | 359/466 |
| 4,986,205 A * | 1/1991 | Somers .......................... | 114/104 |
| 5,357,659 A * | 10/1994 | Ackermann ..................... | 24/662 |
| 5,685,625 A * | 11/1997 | Beaver ........................... | 353/28 |
| 5,809,624 A * | 9/1998 | Nakamae et al. ................. | 26/88 |
| 5,865,519 A * | 2/1999 | Maass ............................ | 353/28 |
| 6,129,649 A * | 10/2000 | Yang .............................. | 482/27 |
| 7,460,299 B2 * | 12/2008 | Ogawa et al. .................. | 359/443 |
| 7,497,159 B2 * | 3/2009 | Kasuya ........................ | 101/127.1 |
| 7,554,729 B2 * | 6/2009 | Sumida et al. ................. | 359/443 |
| 7,883,212 B2 * | 2/2011 | O'Connell et al. ............. | 353/10 |
| 2003/0117583 A1 * | 6/2003 | Werhahn-Wunderlich ..... | 352/88 |
| 2007/0153375 A1 * | 7/2007 | Peterson et al. ............... | 359/443 |
| 2007/0229948 A1 * | 10/2007 | Imafuku et al. ............... | 359/443 |

FOREIGN PATENT DOCUMENTS

| JP | 10-509535 | * 10/1998 |
|---|---|---|
| JP | 2005-043490 | * 2/2005 |

\* cited by examiner

*Primary Examiner* — Clayton E Laballe
*Assistant Examiner* — Kevin Butler
(74) *Attorney, Agent, or Firm* — Thomas, Kayden, Horstemeyer & Risley, LLP.

(57) ABSTRACT

A projection screen apparatus having a retention member configured, in use, to be in contact with at least one surface of a screen along at least a portion of at least one edge of the screen. The projection screen may include polymeric material and the retention member may be bonded to the screen. The retention member may comprise a plurality of apertures and tensioning members extending through the apertures to apply tension to the screen. A portion of each tensioning member extending through the apertures to contact the retention member may be flexible and non-resilient. The retention member may be configured to allow slidable engagement with the plurality of tensioning members. Each retention member may comprise biasing means configured to bias each retention member away from a neighboring retention member, the biasing means adjustable to vary the bias applied when the screen is in situ.

33 Claims, 7 Drawing Sheets

PROJECTION SCREEN AND METHOD OF CONSTRUCTIONS

This application claims the priority benefit of U.S. Provisional Patent Application No. 61/051,397, entitled "Projection Screen and Method of Construction" and filed on May 8, 2008, and the subject matter of which is hereby incorporated by reference.

The invention relates to a projection screen and method. More particularly, but not exclusively, it relates to a projection screen bonded to a retention member, and a method for constructing such a screen.

The projection of an image upon a partially reflective and partially transparent screen such that it is observable by a viewer positioned in front of the screen is known as a "Pepper's ghost" arrangement from fairground shows.

Pepper's ghost projections have been used in publicity and promotional displays where a presenter resides behind an inclined, partially reflective partially transparent screen, typically a tensioned foil, onto which an image of, for example, a motor vehicle is projected, via at least one reflective surface, see for example EP 0799436. The location of the presenter behind the projected image has a number of inherent advantages over systems where the presenter stands in front of a screen, not least of which is that the presenter does not obscure the projected image when walking across the projected image. Additionally, the use of an inclined screen results in a viewer of the image perceiving the image as having depth rather than merely being a two dimensional image, for example where a motor vehicle is seen to rotate upon a turntable.

However, current image projection apparatus' do have a number of problems associated with them, for example, mounting of the foil can prove difficult which in turn leads to uneven tensioning of the foil and wrinkles upon the foil, that impair the viewed quality of the image. It is well known in the art that wrinkles inevitably form in a screen over a period of time with a resultant distortion of the projected image. Indeed, a wrinkle-free screen may be assembled in the evening, and by the following morning, wrinkles will have appeared as a result of the screen settling. Furthermore a change in conditions, such as humidity or temperature, can cause wrinkles to form in the space of minutes. In practice, it has been found that due to the thickness of large sized foils (e.g. 4 meter length foils are 88-110 microns thick and 5.5 meter length foils are approximately 50 microns thick) settling of the screen often only occurs after approximately 48 hours. When wrinkles appear, it is necessary to retension the screen and in particular the levels of tension required exceed those achievable by user force alone.

WO 2005/096095 (Musion Systems Limited) provides an apparatus capable of providing even tensioning of the foil by application of pressure at a plurality of positions along at least one edge of the screen. This apparatus requires placing an edge of the screen between jaws and passing a bolt through the screen. A nut is then threaded onto the bolt and tightened to hold the screen between the jaws. Tensioning is provided via straps which are attached to the jaws. Each of the tensioning straps can be tightened or loosened individually to allow an even tension to be applied over the whole of the screen.

There is becoming an ever increasing need for Pepper's ghost projections in more unusual locations and similarly a great need for larger projection images requiring larger screen sizes (such as those in excess of 5 meters in length). This is placing an increasing burden on the complexity of construction of a projection apparatus capable of projecting a high quality image.

Thus, according to a first aspect of the invention there is provided a polymeric projection screen having a retention member configured, in use, to be in contact with at least one surface of the screen along at least a portion of at least one edge of said screen, characterized in that the retention member is bonded to the screen.

The invention therefore provides a simplified arrangement to that described in WO 2005/096095 and other projection screens. For example, a screen width of 12 meters would require approximately 44 holes to be made in the screen. This is not only time consuming but presents a large probability that the screen will be torn, damaged or the overall strength of the screen may be weakened. By contrast, the present invention provides a simplified arrangement wherein the retention members can be simply bonded to the screen at any point without the need for creating holes in the screen and weakening the screen. The resultant screen is therefore more likely to withstand the high tension loads (often as much as 250 kilos of load for every linear meter in width of the foil—thus a 4 m×4 m foil requires 1 000 kilo of break strain to be applied) required to completely eliminate wrinkles without being damaged.

It will be appreciated that the retention member may comprise two separate retention members placed either side of the screen such that contact is achieved with both surfaces of the screen. However, in an alternative embodiment, the retention member comprises a single retention member extruded as a substantially U-shaped member such that contact is achieved on both surfaces of the screen. For example, the retention member comprises a channel through which the screen may pass prior to being bonded thereto. In a further alternative embodiment, the retention member comprises a single retention member such that contact is achieved on a single surface of the screen.

It will be appreciated that the retention member may be constructed from a variety of materials desirably capable of withstanding the high pressures which will be exerted upon the screen during the tensioning process. In one embodiment, the retention member is constructed from a lightweight metal (e.g. aluminium) or a plastics material. The retention member may be made from a flexible material such that the retention member attached to the screen can be rolled about a cylinder, for example a cylinder having at least a 50 cm diameter and preferably a diameter of between 80 to 100 cm. This is advantageous as the retention member can be attached to the screen at one location and packaged for delivering to another location by rolling the screen and attached retention members about a cylinder. At the delivery location the screen and retention member can be simply unrolled and erected without the need for attaching the retention members and having the necessary tools for attaching the retention members at the delivery location. The retention members may be made of a plastic material that can be extruded. Extruding the retention members is advantageous as very long, for example 100 m long, retention members can be formed such that there is no need to join separate retention members together to form a screen. Joining separate retention members together, such as steel retention members can undesirably result in wrinkles in the screen. In a further embodiment, the retention member is constructed from a plastics material, such as a plastics material (e.g. polyethylene terephthalate; PET).

The polymeric projection screen may be constructed from a lightweight material, such as polyester. The use of lightweight material is advantageous as it allows easy manipulation and mounting of the screen in a stage environment.

It will be appreciated that the bonding process will typically comprise any means for bonding of the retention member to the screen without requiring holes to be created in the screen. In one embodiment, the bonding will be non-reversible.

In one embodiment the bonding comprises a bonding that is suitable for use with polymeric materials, for example the use of welding such as ultrasonic welding.

In one embodiment, the bonding may be provided by a single, continuous weld or a series of welds at a plurality of positions. Application of a continuous weld requires the screen to be laid on a flat surface which is not always possible or convenient for large sized screens in venues with limited space. Thus, in a preferred embodiment, the bonding is provided by a series of welds (e.g. spot welds) at a plurality of positions. Spot-welds (e.g. ranging in size from approximately 2-3 mm in diameter or greater, such as approximately 10×15 mm) can be applied by portable welding equipment (e.g. ultrasonic welding equipment). Such equipment is readily available and will typically provide ultrasonic energy at a resonant frequency of between 20 and 40 kHz. This enables simple attachment of a retention member to an edge of the screen.

In an alternative embodiment the bonding comprises the use of a chemical agent (e.g. an adhesive). It will be appreciated that the chemical agent may be applied in an analogous manner to that of the ultrasonic welding described hereinbefore (i.e. in either a single, continuous application or a series of applications at a plurality of positions).

In a yet further alternative embodiment, the bonding comprises the use of vacuum bonding. Such an embodiment will rely on the use of a material which upon application of pressure to the screen and retention member will create a vacuum bond between the retention member and the screen. Such vacuum bonding provides a simple and strong bonding mechanism. Examples of materials capable of providing such vacuum bonding are currently used in the manufacture of tennis rackets and cricket bats. It will be appreciated that the vacuum bonding may be provided by direct attachment of the retention member to the screen or it may be provided by indirect attachment of the retention member to the screen via the presence of an additional rubberised substrate between the retention member and the screen. This embodiment provides significant advantages over the other forms of bonding provided hereinbefore in that the bonding is reversible and can be re-used. Positioning of the retention members along one edge of the screen in a uniform manner can be a difficult task and the vacuum bonding will allow re-seating to ensure that the retention members are positioned in the optimum position. Furthermore, the bonding properties will remain even when subjected to the influences of heat and moisture. Additionally, the pressure required to form the vacuum bond is very low and therefore the screen is subjected to less tensile pressure and is less likely to be damaged during the bonding process. Although constructed in an entirely different manner to the screen apparatus described in WO 2005/096095, this document describes the presence of an abrasive coating (such as sandpaper) between the screen and the retention member to enhance the grip upon the screen. This abrasive coating causes significant scratching of the screen and in view of the thinness of the screen is very likely to damage the screen and weaken the overall strength of the material. Furthermore, if insufficient force is applied between the retention member and the screen, then the screen will slip and cause undesirable wrinkles in the screen. Thus, the abrasive coating provides a number of disadvantages each of which are solved by the bonding arrangement of the invention (in particular the vacuum bonding embodiment).

In an alternative embodiment, the bonding comprises a first retention member composed of a magnetic material in co-operation with a second retention member composed of either a metallic or magnetic material. This magnetic bonding embodiment provides the significant advantage of providing strong bonding by sandwiching the screen between two retention members in addition to providing a reversible bonding process. It will be appreciated that the magnetic material will be any suitable magnet capable of strong attachment to a corresponding metallic or magnetic material. Examples of magnetic materials include iron ore (magnetite or lodestone), cobalt, nickel, gadolinium, dysprosium and rare earth magnets such as samarium (e.g. samarium-cobalt) and neodymium (e.g. neodymium-iron-boron (NIB)) magnets. In one embodiment, the magnetic material is neodymium (e.g. neodymium-iron-boron (NIB)) magnet. In addition to the magnetic retention member embodiment, it is also envisaged that pre-existing metallic retention members can be secured to a screen using magnetic bolts made from a magnetic material as described hereinbefore for the magnetic bonding embodiment. For example, the nut and bolt arrangement may be replaced with a single magnetic bolt which holds the screen firmly in place without the need for tightening a nut to the bolt.

In one embodiment, the retention member is located along two opposing sides of the screen. However, it will be appreciated that the retention member need not run the entire length of the edge of the screen. For example, in one embodiment, the length of the retention member may correspond to the length of the screen. In an alternative embodiment, the retention member may comprise a series of shorter lengths along the entire length of the screen. Such embodiments will find applicability in a wide range of varying screen sizes and shapes, in particular non-convention shapes such as triangular, pentagonal, hexagonal or octagonal.

Once the retention member has been bonded to the screen as hereinbefore defined, the screen is then tensioned to remove all wrinkles. The tensioning process typically comprises attachment of a plurality of tensioning members to the screen by one end of the tensioning member, with the other end of the tensioning member being attached to a frame or truss member. The tensioning members typically comprise a strap or cord having a ratchet or friction locking buckle. The tensioning members will then be tightened or loosened to result in a wrinkle free screen.

The significant advantage of the bonding embodiment of the invention is provided when the screen is tensioned at two opposing sides. If a wrinkle subsequently appears then the bonded retention member described herein may be retrofitted to the screen at any of the remaining sides of the screen in order to simply and effectively remove the wrinkle. For example, pressure could be applied in a different direction to that previously applied which is more likely to remove the wrinkle than simply applying greater pressure in the existing direction. This arrangement of in situ addition of further retention members and tensioning members could not have been possible with the conventional arrangements without complete dismantling of the apparatus. The invention therefore represents a significant advance to current projection arrangements.

In one embodiment, the screen has one or more cut-out portions or apertures. These portions will be non-reflective and will typically enable a projector to be positioned such that the image can be beamed through the cut-out portion (or window). This arrangement provides the significant advantage that the "keystone effect" (the creation of elongated or distorted images occurring due to angled projection) is reduced. The cut-out portions may also allow miscellaneous props to be positioned on a live set which may protrude through the screen and create a more realistic 3-dimensional environment. Prior to the invention, these cut-out portions would not have been possible because of the restricted tensioning arrangements. The provision of the in situ addition of individual retention members at any position around the screen provides an effective manner of tensioning a screen to be wrinkle-free even when cut-out portions are present.

In one embodiment, the retention members comprise means for attachment of a plurality of tensioning members. In one embodiment, the attachment means comprise a plurality of apertures.

Thus, according to a second aspect of the invention there is provided a projection screen having a retention member configured, in use, to be in contact with at least one surface of the screen along at least a portion of at least one edge of said screen, the retention member comprising a plurality of apertures, and a plurality of tensioning members extending through the apertures to apply tension to the screen, wherein a portion of each tensioning member that extends through one of the apertures to contact the retention member is flexible and non-resilient. In this way, forces applied by the tensioning members are substantially in a plane of the screen. In particular, any misalignment of the tensioning member between an attachment point and the plane of the screen that causes twisting of the tensioning member does not result in undue torsion forces being applied to the screen. For example, if the tensioning member comprised a rigid portion that passed through the aperture to contact the retention member, twisting of the tensioning member due to misalignment could result in the rigid portion jamming across the aperture, resulting in the torsion forces being transmitted to the screen. Such torsion forces could create imperfections, such as, wrinkles, in the screen.

In this embodiment, a tensioning member may be threaded through the aperture and pressure may be applied to both ends of the tensioning member in the same direction. Such an arrangement provides a simplified attachment mechanism which also has the advantage of being lightweight due to the presence of the apertures. In one embodiment, the apertures are circular, oval or elongated slots. In a preferred embodiment, the apertures are elongated slots.

Each tensioning member may comprise a further flexible and non-resilient portion away from a point of contact with the retention member. In this way, the tensioning member can twist between the attachment point and the retention member to compensate for any misalignment.

The tensioning members may be straps, such as canvas straps, cord or the like. In an alternative embodiment, the retention members are configured to allow slidable engagement with the tensioning members.

Thus, according to a third aspect of the invention there is provided a projection screen having a retention member configured, in use, to be in contact with at least one surfaces of the screen along at least a portion of at least one edge of said screen, characterised in that the retention member is configured to allow slidable engagement with a plurality of tensioning members configured to apply tension to the screen.

Such an embodiment provides the advantage that the tensioning members can be moved to any position. This arrangement overcomes the problem of removing a wrinkle which appears between the positions of two fixed tensioning members. In this embodiment of the invention, a slidable tensioning member may be loosened, slid into the position of the wrinkle and then tensioned immediately to remove the wrinkle.

According to a further aspect of the invention there is provided a projection screen having a plurality of retention members configured, in use, to be in contact with at least one surfaces of the screen substantially around the periphery of said screen, characterised in that each retention member additionally comprises biasing means configured to bias each retention member away from a neighbouring retention member, the biasing means adjustable to vary the bias applied to the retention member when the screen is in situ.

This aspect of the invention provides the significant advantage of a self-tensioning apparatus. For example, the tension provided between each retention member will result in a wrinkle-free screen. The bias can be adjusted to remove/prevent appearance of wrinkles. For example, wrinkles may occur with changes in conditions, such as changes in humidity or temperature and/or due to slackening of the tension of the screen over time. Furthermore, this aspect of the invention does not require a separate frame. The retention members around the periphery of the screen provide a self-supporting screen which neither requires rigging to a frame nor the addition of separate tensioning devices attached to the screen within the frame. This aspect of the invention provides the significant advantage of providing a screen which is both self-supporting and self-tensioning. This arrangement is a significant departure from conventional projection apparatus and optimum results have been achieved with this aspect of the invention when the screen is circular.

In one embodiment, the biasing means will comprise a spring or other resilient member. In an alternative embodiment, the biasing means will comprise mechanical means for manually increasing the biasing force exerted between each retention member. Such mechanical means may comprise a threaded nut which is able to extend or retract the distance between each retention member in order to adjust a desired amount of biasing force applied between each retention member.

It will be appreciated that the retention member of the self-tensioning aspect of the invention may comprise any suitable retention member (either described hereinbefore or conventionally available). In one embodiment, the retention member comprises two components which hold the screen in place via a clamping action.

It will be appreciated that the retention members described herein constitute separate items of commerce from the screen per se and therefore represent additional embodiments of the invention. In particular, the retention member described for the self-tensioning aspect of the invention comprising the biasing means also represents a separate aspect of the invention.

In one embodiment, the screen is a foil. In a further embodiment, the screen comprises a partially reflective layer upon at least one surface. In one embodiment, the screen is constructed from the same material as the retention member. In a further embodiment, the screen is constructed from a plastics material (e.g. polyethylene terephthalate; PET). In an additional embodiment the screen is constructed from a biaxially oriented plastic foil.

According to a further aspect of the invention there is provided a projection screen comprising biaxially oriented polymeric foil.

The biaxial stretching that occurs to the polymeric, such as polyester, extrusion during manufacturing enhances the mechanical properties of stiffness and strength by orienting the molecules in the foil. Of significance is the fact that this stretching process ensures that mechanical properties are roughly similar in the longitudinal direction (along the length of the screen roll) and the transverse direction across the width of the foil. It is this screen property which enables rigging of the screens when tension is generally applied in one direction only e.g. bottom to top or side to side. As the foil has roughly equal properties in both directions the wrinkles are removed fairly easily provided the foil is held stable in the top to bottom orientation as tension is applied.

If the foil is not biaxially oriented the wrinkles would be more difficult to remove when tension is applied only in one direction as the foil would tend to narrow across its width. This narrowing across its width (or length if tension is applied only side to side) can to a large extent be stabilized by the use of retention members applied to sandwich the edge region of a foil. The retention members may have bolts that pierce through the foil or have applied to their inner faces abrasive or bonding surfaces that once the retention member is applied, prevent slipping (or contracting) of the foil, preferably, not just in the direction that tension is applied but in all directions. Furthermore the slip control may extend to the far corners of the foil.

A further aspect to removing wrinkles in the screens is the need for high tension loads. The screens thus need to have sufficient mechanical properties to resist these loads otherwise the screens will stretch and tear. The molecular stretching process in the manufacture of biaxially oriented polymeric foils results in enhanced mechanical properties which are able to resist the high rigging loads. Screens made from biaxially oriented plastics are also superior to those manufactured from cast or blown film due to these better mechanical properties.

The biaxial foil may comprise a silver coating. The biaxial foil may be a contrast foil (a foil having a grey or black tint).

According to a further aspect of the invention there is provided an image projection apparatus comprising a light emitting device a frame, and an at least partially transparent screen as hereinbefore defined, the frame being arranged to retain the screen under tension, such that the screen is inclined at an angle with respect to a plane of emission of light from the light emitting device; the screen having a front surface arranged such that light emitted from the display device is reflected therefrom; and the light emitting device being arranged to project an image such that light from the light emitting device impinges upon the screen such that a virtual image is created from light reflected from the screen, the virtual image appearing to be located behind the screen.

It will be appreciated that the light emitting device is any light source which is capable of being reflected from an at least partially transparent screen. Examples of light emitting devices include a projector, a liquid crystal display (LCD) screen, a thin-film transistor (TFT) screen, a plasma screen or a light emitting diode (LED) wall (e.g. a high brightness LED wall of variable pitch ranging between 2-30 mm between each LED).

The light emitting device can also include objects of stage and set design illuminated by a light that does not necessarily display image processing capabilities.

According to a further aspect of the invention, there is provided a method for constructing a projection screen which comprises the steps of:
(a) bringing a retention member in contact with at least one surface of the screen along at least a portion of at least one edge of said screen; and
(b) bonding the retention member to the screen.

In one embodiment, the method additionally comprises the steps of:
(c) attaching the at least a portion of at least one edge of said screen to a frame or truss member by one or more tensioning members; and
(d) applying tensile force to the one or more tensioning members.

The retention member may be made of flexible material and the method may further comprise rolling the projection screen around a cylinder. In this way, the projection screen can be delivered to a required location.

According to a further aspect of the invention there is provided a method of constructing a projection screen comprising a) extruding polymeric retention members configured, in use, to be in contact with at least one surface of a screen and b) bonding the retention members to the screen.

The method may comprise cutting the extruded retention members to an appropriate length for the screen before bonding the retention members to the screen.

It will be appreciated that the features and elements of the invention described hereinbefore for the screen are also applicable to the method described hereinbefore.

For example, it will be appreciated that the method of the invention not only finds application in the initial construction of the screen but also in situ tensioning of the screen after construction in order to remove wrinkles during the settling process.

The invention will now be described, by way of example only, with reference to the accompanying drawings, in which.

Figure 1:
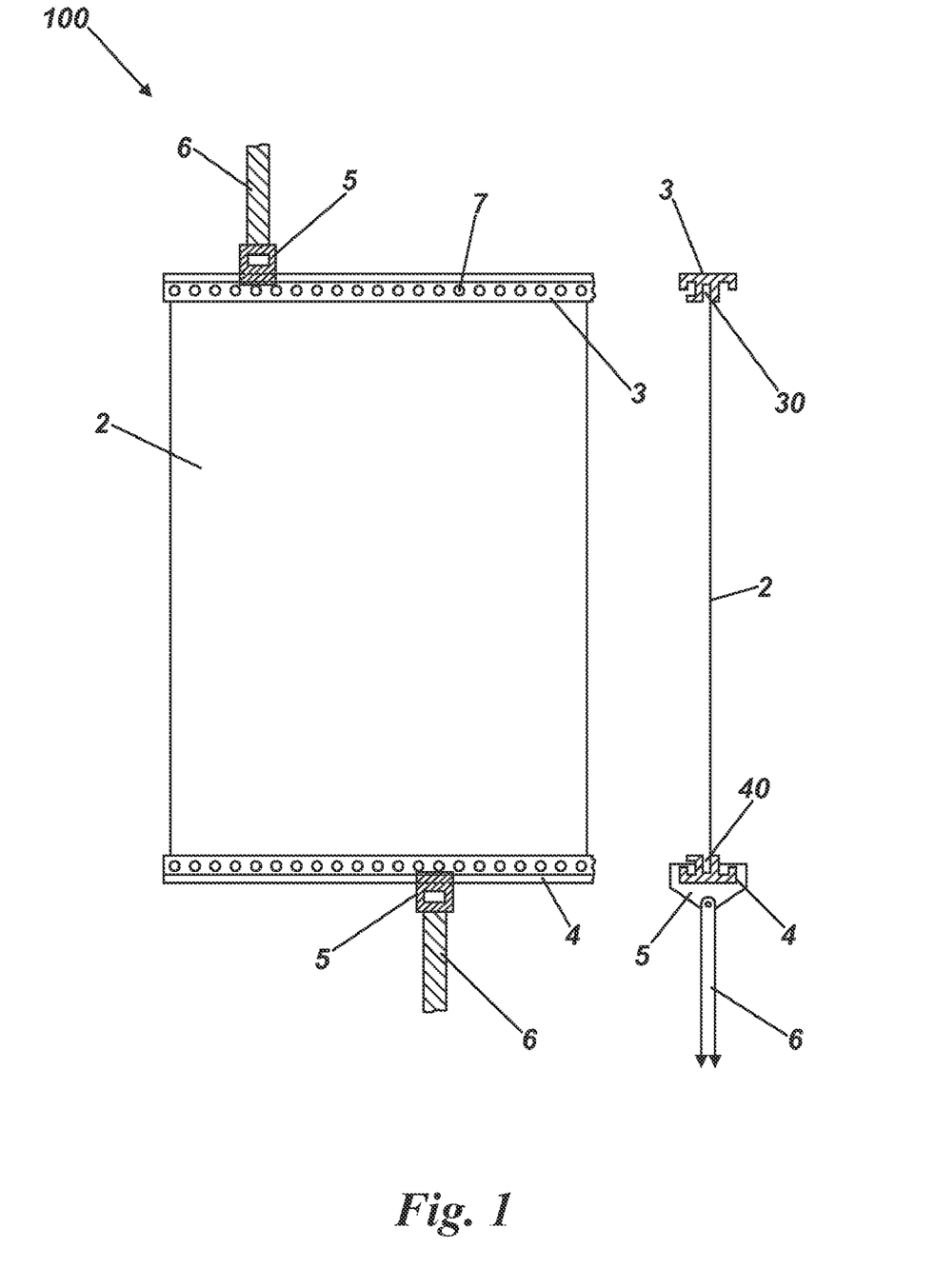
FIG. 1 shows a front and side view of the ultrasonic bonding embodiment of the invention.

Referring first to FIG. 1, a projection apparatus shown generally as 100, comprises a polymeric projection screen 2, retention members 3, 4, tensioning brackets 5, tensioning straps 6 and a series of ultrasonic spot-welds 7. The screen 2 is shown as a foil and the retention members 3, 4 are each shown as an extruded or moulded plastic (e.g. PET) gripper bar although it will be appreciated that other means of construction could be envisaged.

In use, the screen 2 is inserted into the extruded channel 30, 40 of each of the retention members 3, 4 and then ultrasonically bonded to create the series of spot-welds 7. The ultrasonic bonding will be created by a portable ultrasonic welding device comprising an ultrasonic horn backed by a small hand-held anvil. The horn is attached via a cable to a high frequency ultrasonic generator capable of generating ultrasonic energy in the range of 20 to 40 kHz. Each spot weld may typically range from approximately 2 to 3 mm in diameter or greater and takes 1 to 2 seconds to create. The tensioning brackets 5 are configured to attach to the profiled cross-section of the retention members 3, 4 and tensile force can then be applied to the screen via the tensioning straps 6. The tensioning embodiment shown in FIG. 1 comprises the sliding engagement embodiment. For example, if wrinkles appear after settling of the screen, a tensioning strap may be loosened, slid to an appropriate position and then re-tensioned to remove the wrinkle. It will be appreciated that the sliding arrangement of the tensioning brackets constitutes an additional inventive feature and finds applicability in other forms of screen and retention member attachment.

Figure 2:
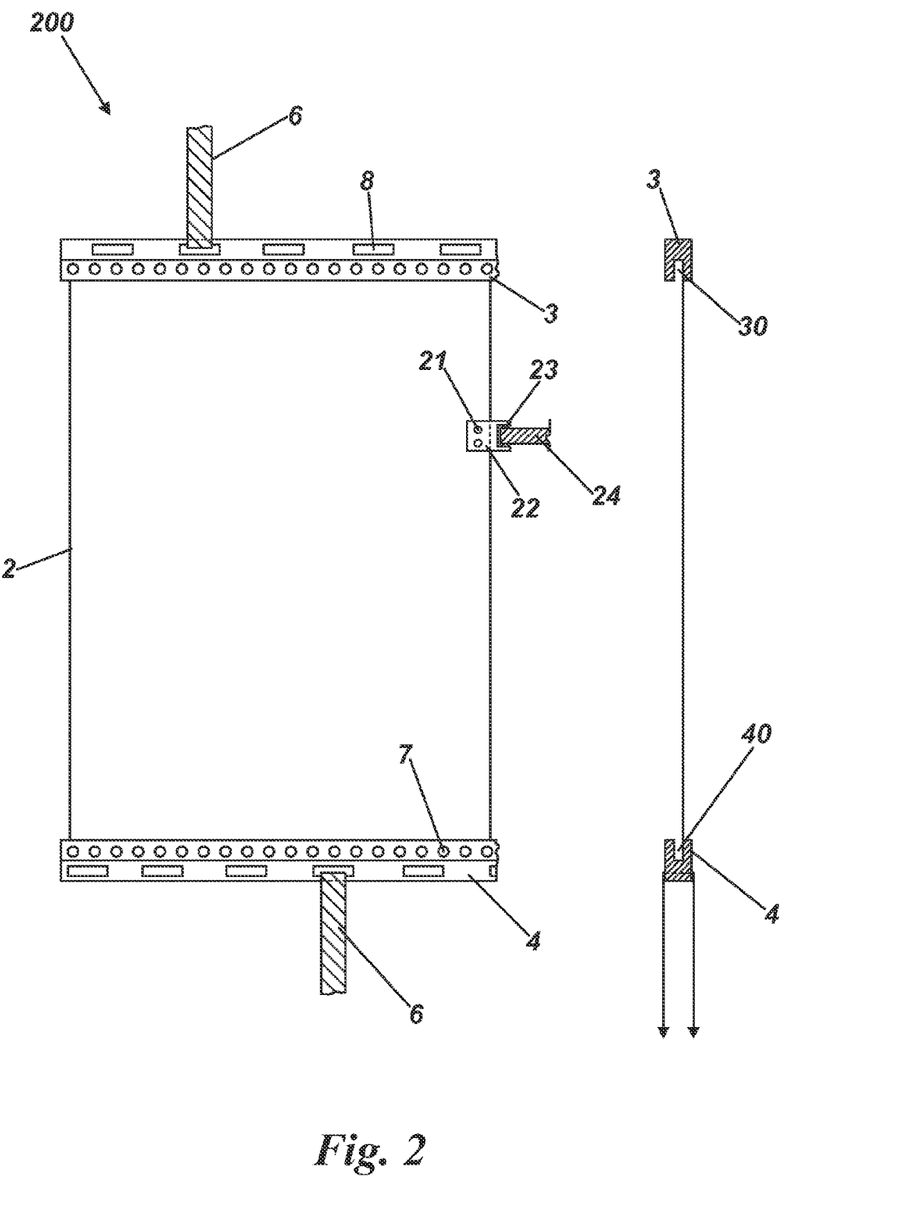
FIG. 2 shows a front and side view of the ultrasonic bonding embodiment of the invention with the addition of an in situ retention member.

FIG. 2 shows a projection apparatus shown generally as 200, comprising a polymeric projection screen 2, retention members 3, 4, tensioning straps 6, a series of ultrasonic spot-welds 7 and a series of elongated slots 8 within each of the retention members 3, 4. The screen 2 is shown as a foil and the retention members 3, 4 are each shown as an extruded or moulded plastic (e.g. PET) gripper bar although it will be appreciated that other means of construction could be envisaged. The tension straps 6 are flexible and non-resilient such that small misalignment between an attachment point and the plane of the screen 2 are compensated for by twisting of the tension straps 2 without applying undue forces to the screen 7. In particular, as a portion of the strap 6 that extends through the apertures 8 is flexible and resilient the straps do not apply significant lateral forces to the retention member if twisting of the strap 6 occurs. The forces applied by the tensioning straps 6 to the screen 2 are substantially in the plane of the screen 2.

In use, the screen is bonded to the retention members 3, 4 in an identical manner to that described for the embodiment of FIG. 1. The tensioning arrangement in FIG. 2 differs from FIG. 1 in that a separate tensioning bracket is not required. Each tensioning strap 6 passes directly through the aperture 8 present in the retention members 3, 4. A further difference between FIG. 1 and FIG. 2 is the presence of a separate retention member which may be bonded after initial construction of the projection apparatus. In the event that a wrinkle appears following settling of the screen, an additional retention member 22 may be ultrasonically bonded to the screen 2 with spot-welds 21 at the exact position of the screen 2 which would easily facilitate removal of the wrinkle. The screen can then be tensioned by passing a tensioning strap 24 through an aperture 23 present in the retention member 22 and applying tensile force to the screen 2 to remove the wrinkle. It will be appreciated that the tensioning arrangement comprising apertures constitutes an additional inventive feature and finds applicability in other forms of screen and retention member attachment.

Figure 3:
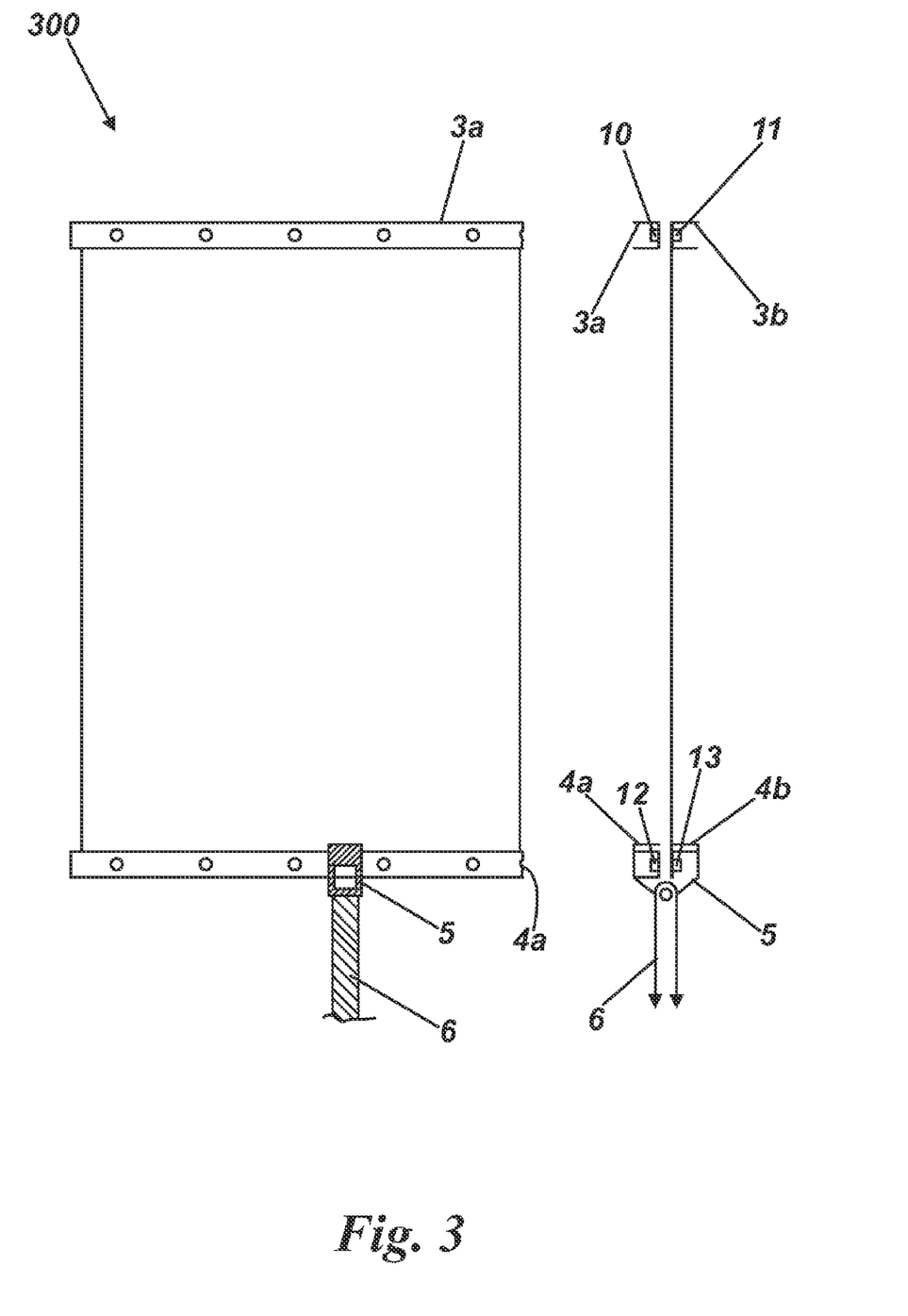
FIGS. 3 and 4 show a front and side view of the vacuum bonding embodiment of the invention.

FIG. 3 shows a projection apparatus shown generally as 300, comprising a projection screen 2, retention members 3a, 3b, 4a and 4b, tensioning brackets 5, tensioning straps 6 and rubberised vacuum forming strips 10, 11, 12 and 13. The screen 2 is shown as a foil and the retention members 3a, 3b, 4a and 4b are each shown as extruded aluminium gripper bars although it will be appreciated that other means of construction could be envisaged.

In use, a rubberised vacuum forming strip 10 is placed against retention member 3a and a further rubberised vacuum forming strip 11 is placed against retention member 3b. One edge of the screen 2 is then positioned between the retention members 3a and 3b (such that the rubberised vacuum forming strips 11 and 12 are sandwiched between the retention members and one surface of the screen). Pressure is then applied to the edge of the screen in order to bond the screen 2 to the retention members 3a and 3b via a vacuum bonding process from the vacuum forming strips 10 and 11. The same process is then repeated for an opposing edge of the screen 2 using rubberised vacuum forming strips 12 and 13 and retention members 4a and 4b.

The tensioning embodiment shown in FIG. 3 comprises the sliding engagement embodiment exactly as described in FIG. 1.

Figure 4:
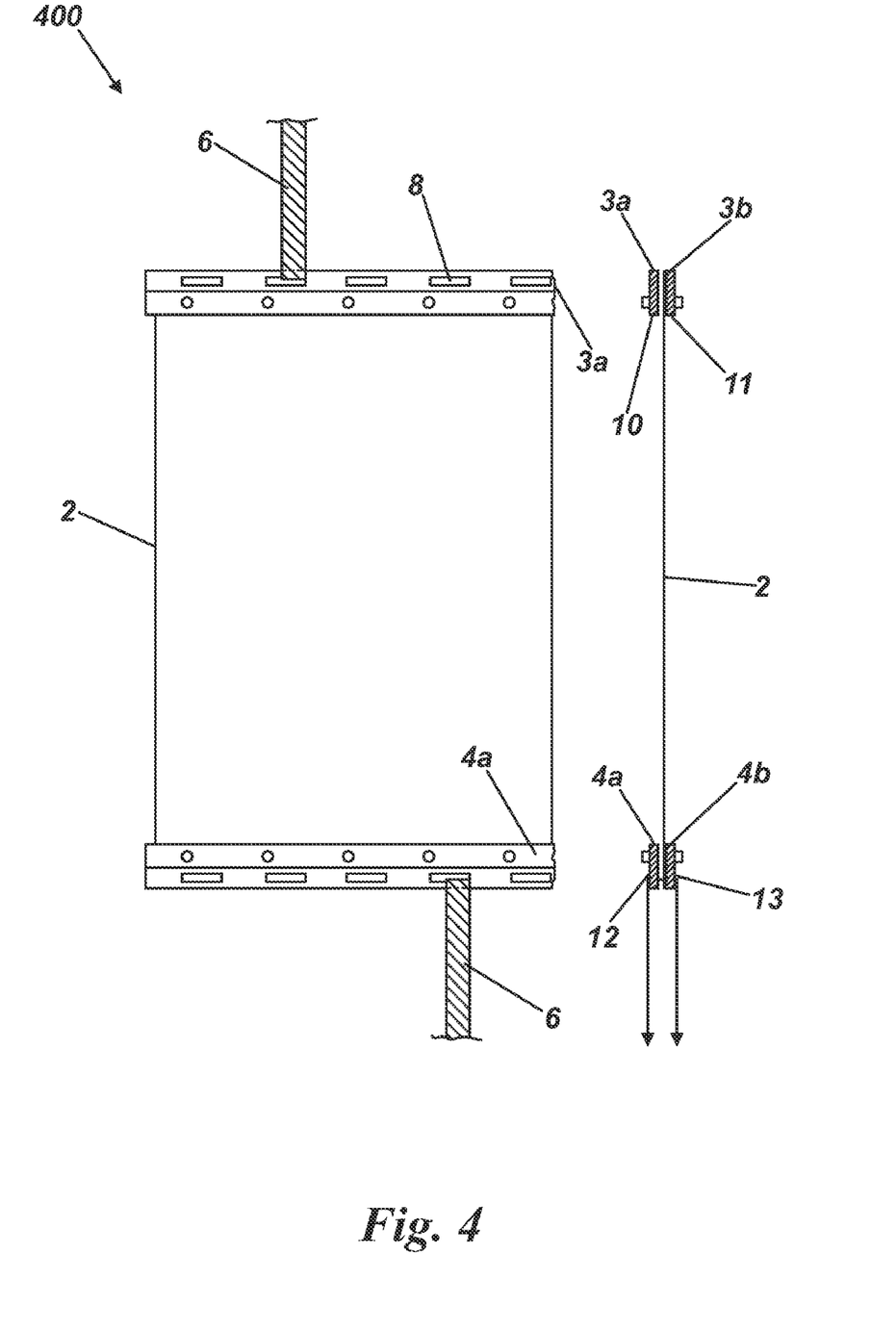

FIG. 4 shows a projection apparatus shown generally as 400, comprising a projection screen 2, retention members 3a, 3b, 4a and 4b, tensioning straps 6, a series of elongated slots 8 within each of the retention members 3a, 3b, 4a and 4b and rubberised vacuum forming strips 10, 11, 12 and 13. The screen 2 is shown as a foil and the retention members 3a, 3b, 4a and 4b are each shown as extruded aluminium gripper bars although it will be appreciated that other means of construction could be envisaged. The bonding process may be performed exactly as described in FIG. 3 and the tensioning process may be performed exactly as described in FIG. 2.

In an alternative embodiment, the rubberised vacuum forming strips 10, 11, 12 and 13 may be inserted between retention members on conventional projection apparatus (e.g. one which uses the disadvantageous fixing holes with bolts). In this embodiment, the rubberised strips will simply replace the abrasive coating previously used to solve the aforementioned problems. It will be appreciated that in the event that bolts and fixing holes are present, in particular with the slidable tensioning arrangement, that the bolt-heads will be recessed within the retention member to allow sliding of the tensioning bracket.

Figure 5:
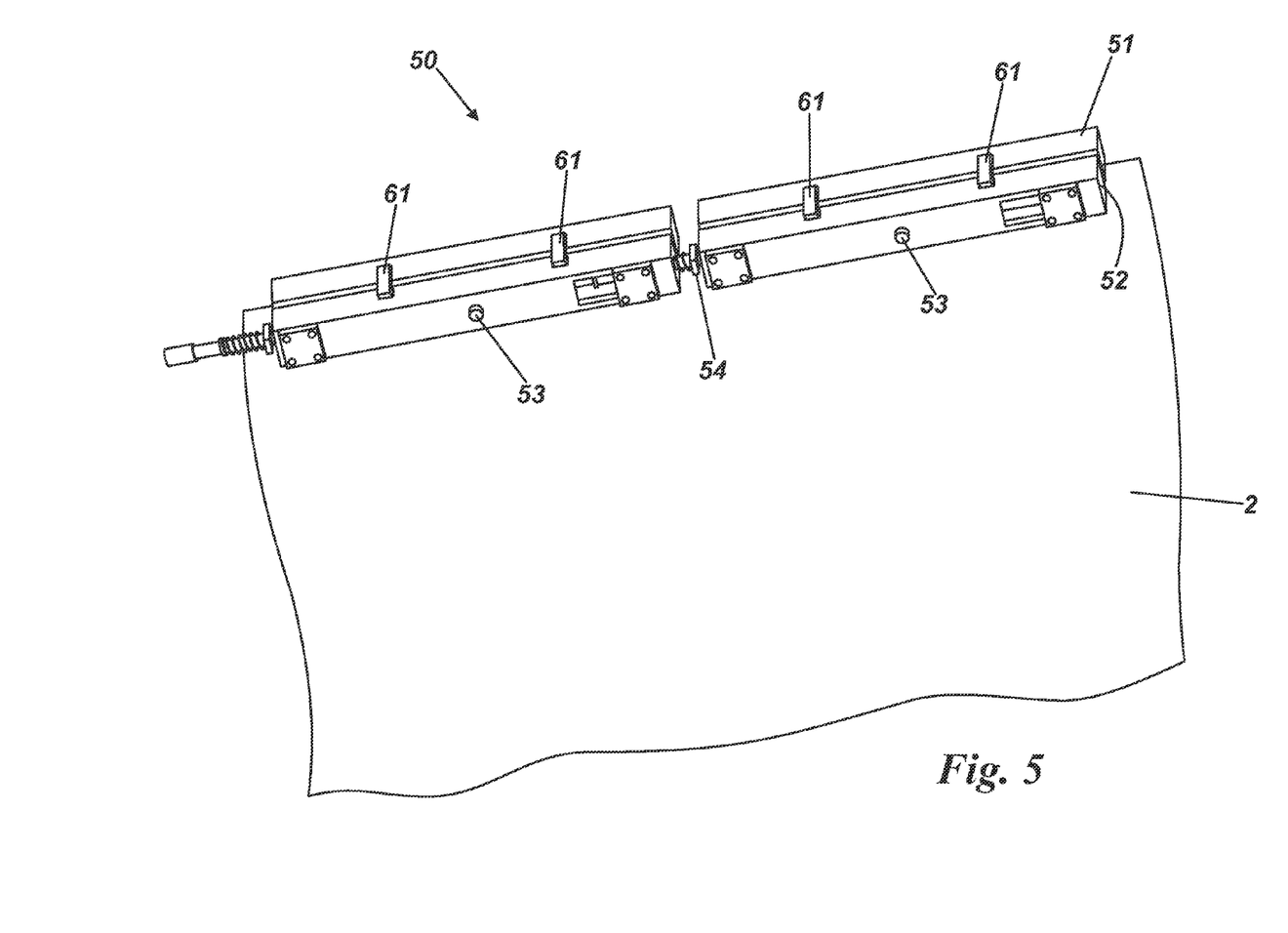
FIGS. 5 to 7 show differing views of the self-tensioning retention member embodiment of the invention.
Figure 6:
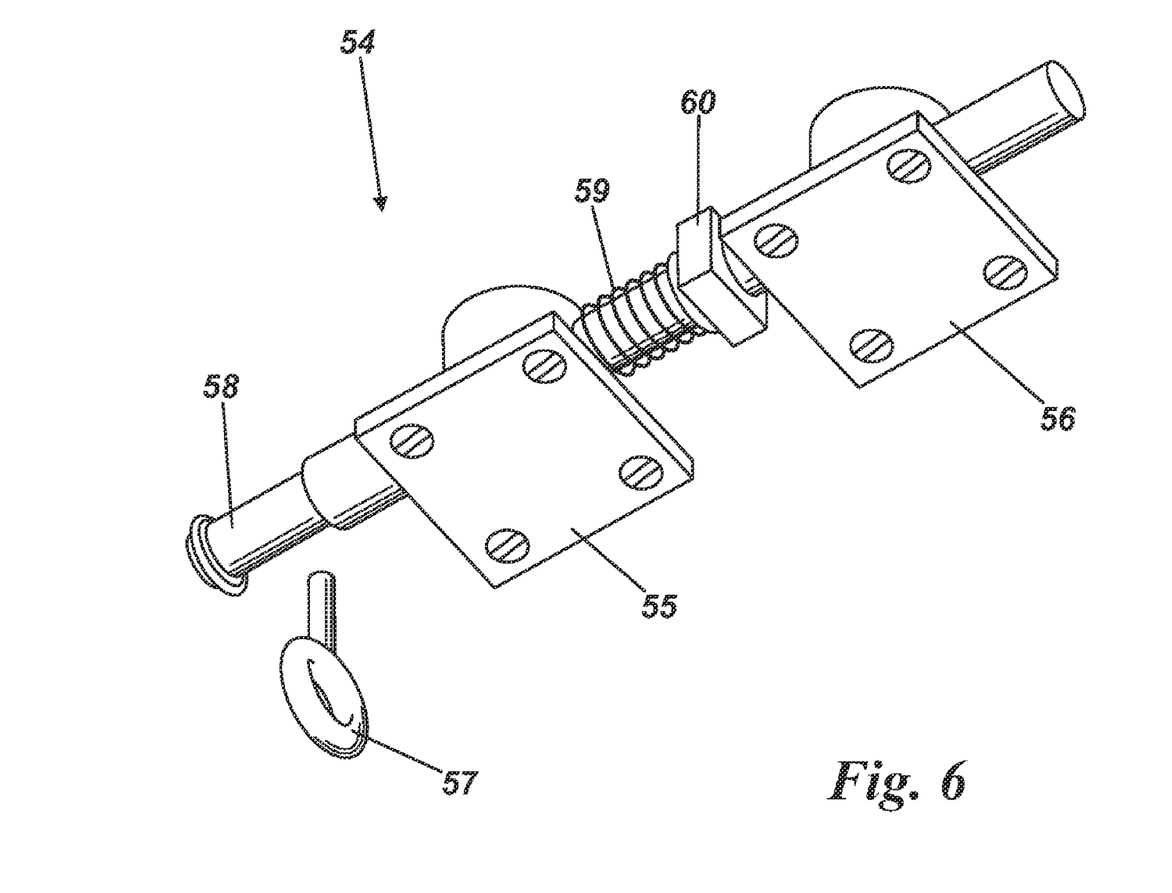

FIG. 5 shows the self-tensioning aspect of the invention. The retention member 50 comprises two components 51, 52 which are configured to sandwich the screen with a clamping action exerted by screw 53. C-section couplers 61 join members 51 and 52. The biasing means 54 are shown in greater detail in FIG. 6 where it can be seen that they comprise two attachment means 55, 56 for attaching the biasing means 54 to two neighbouring retention members 50. The biasing means 54 also comprise a spring 59 which is held against a threaded nut 60. The biasing means 54 also comprise fixing holes 58 for receiving a pin 57 in order to bias the attachment means 55 in a fixed position if desired.

Figure 7:
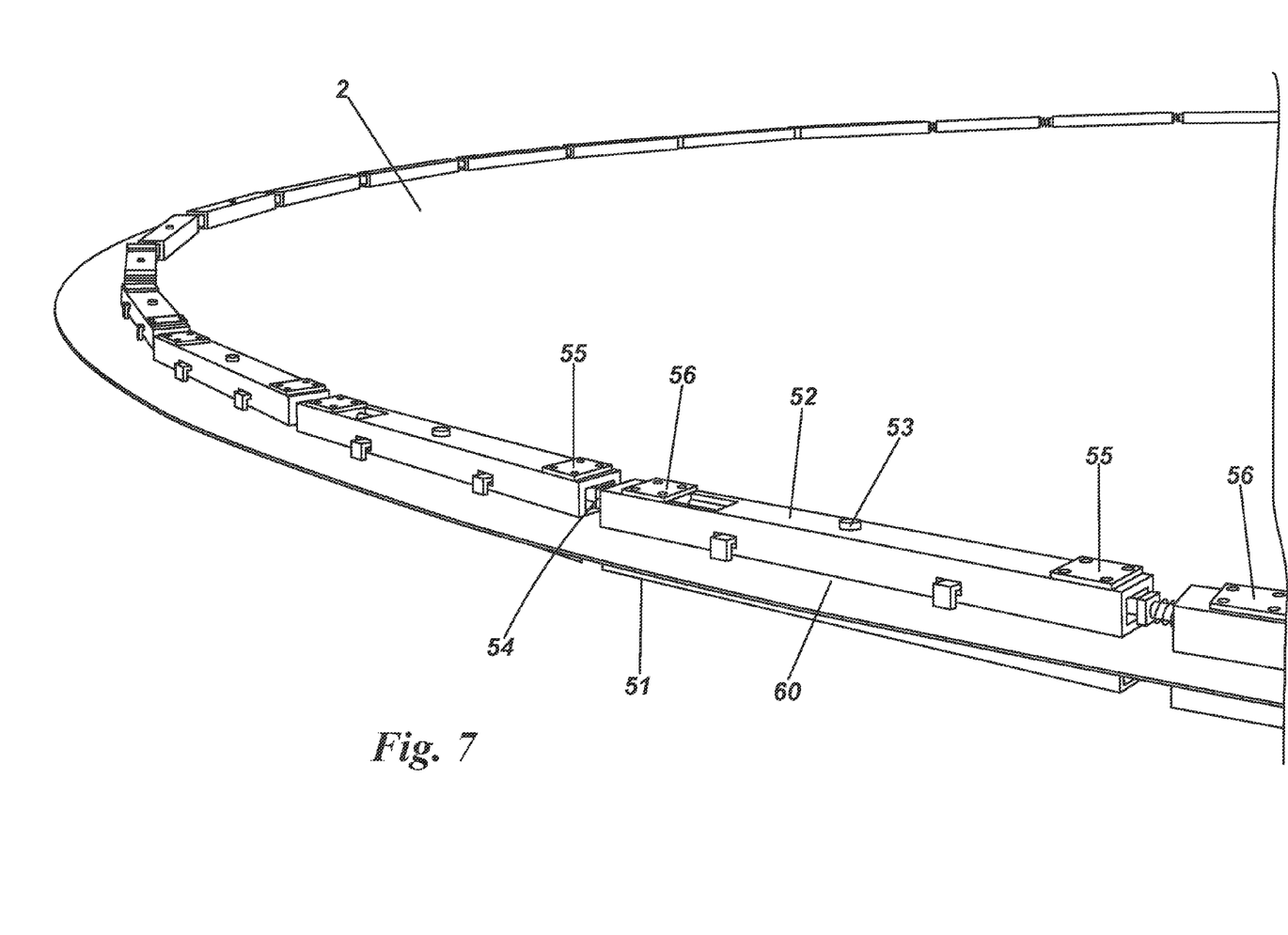

FIG. 7 shows the self-tensioning embodiment attached to a screen 2, wherein in use, the two components 51, 52 of each retention member 50 are placed either side of the screen 2 and clamped together via tightening and clamped together via tightening of the screw 53. Each retention member 50 will then automatically be biased away from each neighbouring retention member 50 by the biasing means 54. If wrinkles occur in the screen or a greater level of tension is required than exerted naturally by the spring 59, then manual adjustment can be made by tightening or loosening the threaded nut 60.

It will be understood that the self-tensioning aspect of the invention is not limited to circular screens but may be applied to other shaped screens.

In one embodiment, the projection screen is a biaxially oriented polyester foil.

The invention claimed is:

1. A projection apparatus, comprising:
   a polymeric screen; and
   a retention member configured, in use, to be in contact with at least one surface of the polymeric screen along at least a portion of at least one edge of said polymeric screen;
   wherein the retention member is vacuum bonded to the polymeric screen.

2. The apparatus of claim 1, wherein the retention member is a substantially U-shaped member.

3. The apparatus of claim 1, wherein the polymeric screen comprises at least one aperture.

4. The apparatus of claim 1, wherein the retention member comprises means for attachment of a tensioning member.

5. The apparatus of claim 1, wherein
   the retention member comprises a plurality of apertures and a plurality of tensioning members operative to extend through the apertures to apply tension to the screen; and
   wherein a portion of a first of the tensioning members that extends through a first of the apertures is flexible and non-resilient.

6. The apparatus of claim 5, wherein the tensioning members are selected from the group consisting of straps and cords.

7. The apparatus of claim 1, wherein the retention member is configured to allow slidable engagement with a plurality of tensioning members configured to apply tension to the screen.

8. The apparatus of claim 1, wherein the retention member comprises biasing means configured to bias each retention member away from an adjacent retention member, the biasing means being adjustable to vary the bias when the screen is in situ.

9. The apparatus of claim 8, wherein the biasing means comprises a resilient member.

10. The apparatus of claim 8, wherein the biasing means comprises mechanical means for manually increasing biasing force exerted between each retention member.

11. The apparatus of claim 1, wherein the screen comprises a biaxially oriented polymeric foil.

12. The apparatus of claim 1, further comprising a partially reflective layer upon at least one surface of the screen.

13. The apparatus of claim 1, wherein:
the apparatus further comprises a light emitting device and a frame; and
the frame is arranged to retain the screen such that the screen is inclined at an angle with respect to a plane of emission of light from the light emitting device;
the screen comprises a front surface arranged such that light emitted from the light emitting device is reflected therefrom; and
the light emitting device is arranged to project an image such that light from the light emitting device impinges upon the screen such that a virtual image is created from light reflected from the screen, the virtual image appearing to be located behind the screen.

14. The apparatus of claim 1, wherein:
the screen is round;
the retention member is a first of multiple retention members; and
the apparatus further comprises biasing mechanisms coupled between corresponding adjacent pairs of the multiple retention members, the biasing mechanisms being operative to selectively alter spacing between respective ones of the adjacent pairs of the multiple retention members such that a perimeter defined by the retention members about the screen selectively expands and contracts.

15. The apparatus of claim 14, wherein each of the biasing mechanisms comprises a screw for altering the spacing.

16. The apparatus of claim 1, wherein the screen is at least partially transparent.

17. The apparatus of claim 1, wherein:
the apparatus further comprises a vacuum forming material positioned, at least partially, between the retention member and the polymeric screen; and
the retention member is vacuum bonded to the polymeric screen with the vacuum forming material.

18. The apparatus of claim 17, wherein the vacuum forming material comprises a rubberized material.

19. A projection apparatus, comprising:
a polymeric screen; and
a retention member configured, in use, to be in contact with at least one surface of the polymeric screen along at least a portion of at least one edge of said polymeric screen;
wherein the retention member is welded to the polymeric screen.

20. The apparatus of claim 19, wherein the retention member is welded to the polymeric screen using a series of welds at a plurality of positions along the polymeric screen.

21. The apparatus of claim 19, wherein the polymeric screen comprises at least one aperture.

22. The apparatus of claim 19, wherein the retention member comprises means for attachment of a tensioning member.

23. The apparatus of claim 19, wherein:
the retention member comprises a plurality of apertures and a plurality of tensioning members operative to extend through the apertures to apply tension to the screen; and
a portion of a first of the tensioning members that extends through a first of the apertures is flexible and non-resilient.

24. The apparatus of claim 19, wherein the retention member is configured to allow slidable engagement with a plurality of tensioning members configured to apply tension to the screen.

25. The apparatus of claim 19, wherein the retention member comprises biasing means configured to bias each retention member away from an adjacent retention member, the biasing means being adjustable to vary the bias when the screen is in situ.

26. The apparatus of claim 25, wherein the biasing means comprises a resilient member.

27. The apparatus of claim 25, wherein the biasing means comprises mechanical means for manually increasing biasing force exerted between each retention member.

28. The apparatus of claim 19, wherein the screen comprises a biaxially oriented polymeric foil.

29. The apparatus of claim 19, further comprising a partially reflective layer upon at least one surface of the screen.

30. The apparatus of claim 19, wherein:
the apparatus further comprises a light emitting device and a frame; and
the frame is arranged to retain the screen such that the screen is inclined at an angle with respect to a plane of emission of light from the light emitting device;
the screen comprises a front surface arranged such that light emitted from the light emitting device is reflected therefrom; and
the light emitting device is arranged to project an image such that light from the light emitting device impinges upon the screen such that a virtual image is created from light reflected from the screen, the virtual image appearing to be located behind the screen.

31. The apparatus of claim 19, wherein:
the screen is round;
the retention member is a first of multiple retention members; and
the apparatus further comprises biasing mechanisms coupled between corresponding adjacent pairs of the multiple retention members, the biasing mechanisms being operative to selectively alter spacing between respective ones of the adjacent pairs of the multiple retention members such that a perimeter defined by the retention members about the screen selectively expands and contracts.

32. The apparatus of claim 31, wherein each of the biasing mechanisms comprises a screw for altering the spacing.

33. The apparatus of claim 19, wherein the screen is at least partially transparent.

* * * * *